United States Patent [19]

Powers

[11] 4,400,719
[45] Aug. 23, 1983

[54] TELEVISION DISPLAY SYSTEM WITH REDUCED LINE-SCAN ARTIFACTS

[75] Inventor: Kerns H. Powers, Princeton, N.J.
[73] Assignee: RCA Corporation, New York, N.Y.
[21] Appl. No.: 300,227
[22] Filed: Sep. 8, 1981
[51] Int. Cl.$^3$ ............................................. H04N 9/535
[52] U.S. Cl. .................................... 358/21 R; 358/11; 358/140; 358/160
[58] Field of Search ............... 358/140, 160, 166, 152, 358/21 R, 11

[56] References Cited

U.S. PATENT DOCUMENTS

| | | | |
|---|---|---|---|
| 124,107 | 2/1872 | Dischert et al. | 59/74 |
| 262,619 | 8/1882 | Powers | 278/24 |
| 3,096,398 | 7/1963 | Gabor et al. | 178/6.8 |
| 3,400,211 | 9/1968 | Rainger et al. | 178/6.8 |
| 3,457,369 | 7/1969 | Davies et al. | 178/6.8 |
| 3,970,776 | 7/1976 | Kinuhata et al. | 358/140 |
| 4,127,873 | 11/1978 | Katagi | 358/166 |
| 4,300,162 | 11/1981 | Robers | 358/160 |
| 4,307,421 | 12/1981 | Smit | 358/152 |
| 4,322,750 | 3/1982 | Lord et al. | 358/140 |

OTHER PUBLICATIONS

IBM Technical Disclosure Bulletin, vol. 21, No. 5, Oct. 1978, High Resolution NTSC Television System.
Article "High Definition Television Studies on Compatible Basis with Present Standards", by Broder Wendland which appears in book Television Technology in the 80's, published by SMPTE.

*Primary Examiner*—Richard Murray
*Attorney, Agent, or Firm*—W. H. Meise; E. M. Whitacre

[57] ABSTRACT

A flat-field television image having reduced visibility of horizontal scan lines is generated by receiving first and second fields of interlaced video and progressively generating a scanned image within a time for one incoming field. The progressively scanned image contains interstitital lines between the lines of one field, and consequently the line-scan structure is made less visible, but the flicker rate is undesirably decreased. In order to increase the flicker rate, additional progressively scanned images are generated at a rate equal to or greater than the incoming field rate.

13 Claims, 20 Drawing Figures

THE BLACK RASTER

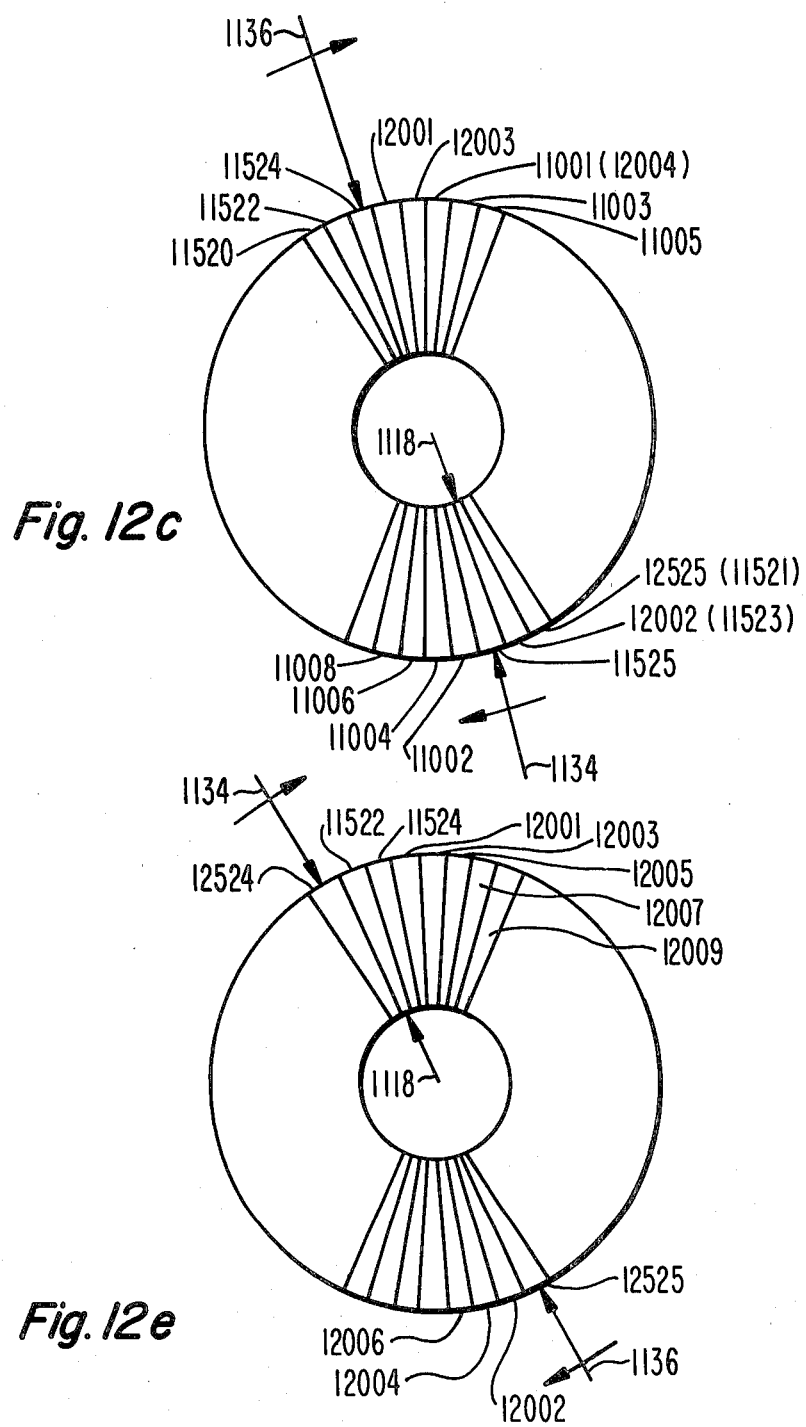

TELEVISION DISPLAY SYSTEM WITH REDUCED LINE-SCAN ARTIFACTS

This invention relates to a television display apparatus such as a television receiver arranged for reduced visibility of line-scan artifacts resulting from interlaced scanning of the scene being imaged.

Television receivers and monitors presently in use do not give the best pictures which are possible within the constraints of existing line-scanning standards. It is desirable to provide subjective improvements to produce a "high-fidelity" display. This problem is discussed in detail in the article "High Definition Television Studies On Compatible Basis With Present Standards" by Broder Wendland which appears in the book "Television Technology in the 80's" published by SMPTE.

A major problem with 525 line-per-frame, 30 frame per-second (525/30) scanning systems such as the NTSC system and in other systems such as 625/25 (PAL) are those artifacts which are derived from the line-scan process itself. The artifacts arise mainly due to the interlace process in the standards. Interlace is a technique for "shuttering" equivalent to the shuttering process in motion-picture technology. The purpose of interlace is to increase the flicker rate of the picture being displayed to reduce the perceptibility of the periodic appearance and disappearance (flicker) of the picture. A high flicker rate is desirable because it gives the appearance of a continuously-existing picture.

In a 525/30 system, 525 lines are scanned in 1/30 second, giving a 30 Hz sample rate. The interlace process divides the 525-line picture or frame into two successive 262½-line fields termed odd (lines 1,3,5 ...) and even (lines 2,4,6 ...). The 262½ lines of the odd field are scanned in 1/60 seconds, followed by scanning of an additional 262½ lines of the even field, with the even-field lines occupying the spaces between the lines of the odd field. In effect, the raster scanned by either field alone may be considered to create a white or colored image interleaved with an unmodulated black raster (FIG. 1). During the next following field, the black lines of the black raster of the previous field are overwritten by the white lines of the following field, but rather than eliminating the visibility of the black raster, the subjective effect or illusion is to create an apparent vertical drift of the black raster. The moving black raster is easily seen when viewing a wide-screen display at close range.

Another artifact caused by interlaced scanning results from the visibility of the scanning lines on the edges of moving objects. This results from a difference in position of the moving object from field to field. The edges of objects in motion have half the nominal vertical resolution and take on a ragged or serrated appearance broken by the clearly visible black scan lines. FIG. 2a illustrates the effect of a black circular object in motion on a white background with the serrate edges clearly visible.

SUMMARY OF THE INVENTION

For producing a flat-field representation of a line-scanned image, lines of video signals representative of each line scan of the image are produced. These line scans are separated in time or in space, or possibly both, so that if displayed they produce an image having an objectionable line-scan structure. The line-scan structure is improved by storing at least one line of the scanned video in a delay or memory. The signal is processed so as to extract from the memory not only the line scans having the objectionable line structure but also video signals representing interstitial lines of the video. The first-mentioned and interstitial lines are displayed to eliminate the line-scan structure. In another embodiment, the objectionable reduction in flicker rate resulting from scanning first and interstitial lines progressively is ameliorated by repeatedly displaying the same information.

DESCRIPTION OF THE DRAWING

FIGS. 12a through 12e represent the memory of FIG. 11 at different times; and

DESCRIPTION OF THE INVENTION

Figure 3:
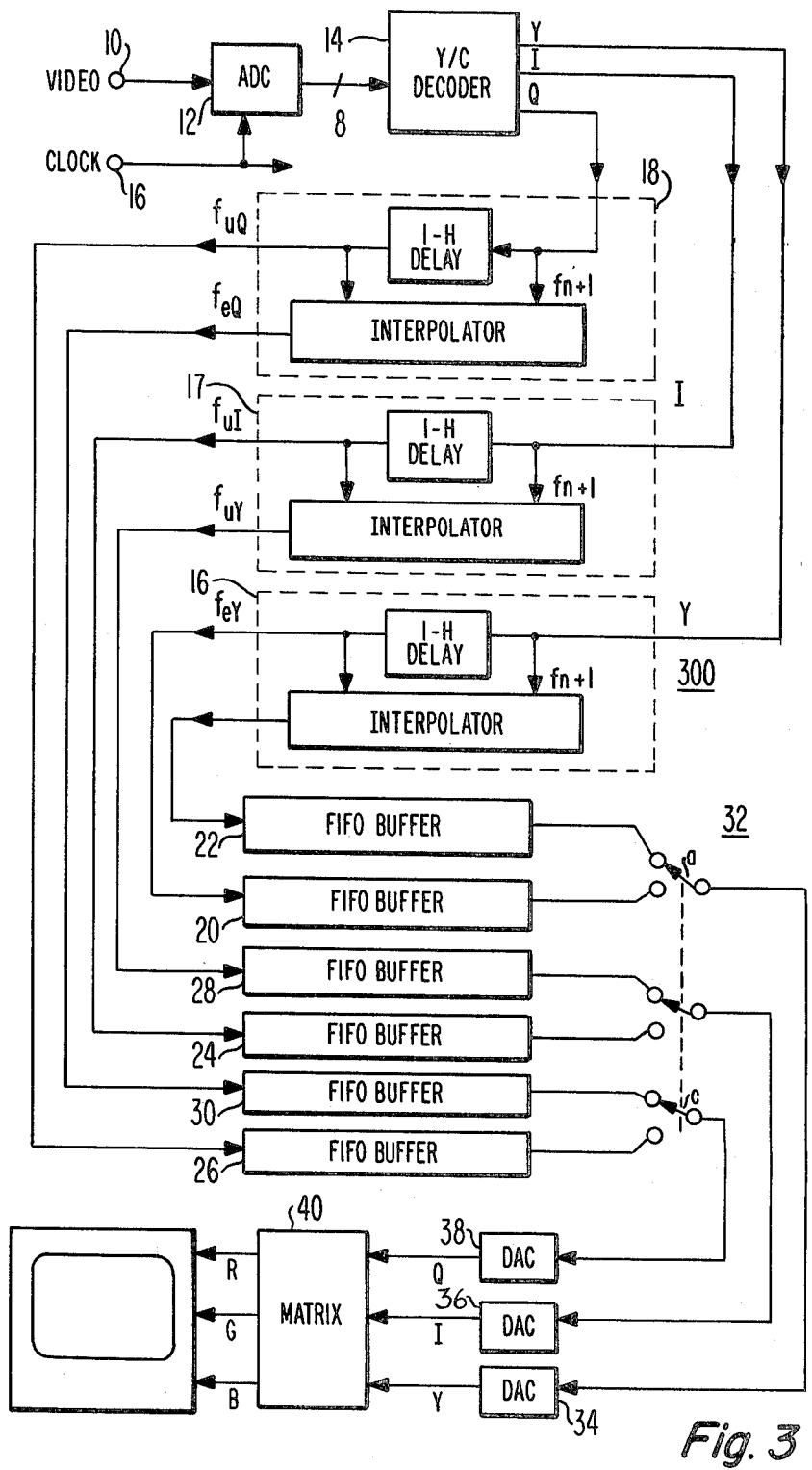
FIGS. 3 and 9 illustrate in block-diagram form embodiments of the invention in which interpolation of successive lines generates interstitial lines for display.

In the configuration of FIG. 3, standard analog NTSC composite interlace-scanned color television signals are applied to a terminal 10 from a source (not shown) and are converted to digital form by an analog-to-digital converter 12 operated at a clock rate under the control of a clock signal applied to a terminal 14 from a source (not shown). The clock signals are also applied to appropriate portions of the remainder of FIG. 3 for timing of the various operations. Generally speaking, the digitized video is applied to an estimator 300 which produces interstitial estimated lines at a double rate for application to a display. Digitized composite video is applied to a luminance-chrominance decoder illustrated as a block 15 which separates the luminance (Y) and the two chrominance signals (I,Q) and applies them to luminance, I and Q estimators 16, 17 and 18, respectively. Each estimator produces a succession of lines of unmodified video $F_U$ delayed from the current video by H (the time for one horizontal line, which for U.S. standards is about 63 $\mu$S). Each estimator also contemporaneously produces lines of estimated or interpolated video($F_e$). The delayed unmodified video derived from the luminance information $F_{uY}$ is applied to a first in-first out (FIFO) buffer 20 which may comprise for example a CCD delay line. The estimated video derived from the luminance information $F_{eY}$ is similarly applied to FIFO buffer 22. The unmodified delayed video derived from the I and Q color information ($F_{uI}$, $F_{UQ}$) is applied to FIFO buffers 24 and 26, respectively, and the estimated color information ($F_{eI}$, $F_{eQ}$) is applied to buffers 28 and 30. Each of the four buffers receives data continuously, and the buffers are read out alternately in pairs 20,22; 24,28; 26,30 to continuously produce separate Y, I and Q output signals. The structure of the buffers may be similar to that described in U.S. patent application Ser. No. 124,107 filed Feb. 25, 1980 in the name of Dischert et al. The buffers are arranged for accepting input signal clocked at one rate and for reading out the signal at a double rate. The double-rate operation during read-out increases the bandwidth of the signal by a factor of two and also shortens the duration of the signals by a factor of two. Consequently, each active line of video which normally occurs in approximately 53 microseconds ($\mu$S) and which is written into a buffer in 53 $\mu$S is read out of the buffer in about 26 $\mu$S. To produce continuous video, a three-pole double-throw toggle switch or electronic gate 32 has a toggle 32a coupled to the outputs of the buffers 20 and 22 for selectively coupling each buffer to an output digital-to-analog converter (DAC) 34. Similarly, a toggle b of switch 32 is arranged to couple the outputs of buffers 24 and 28 alternately to a DAC 36, and a toggle c couples the output of buffers 26 and 30 to a DAC 38. The separate Y, I and Q are reconstituted and filtered to produce reconstituted analog signal free from quantizing steps. The reconstituted Y, I and Q signals are applied to a matrix circuit 40 which generates R, G and B signals which are applied to a display unit including a kinescope operated at a 31.5 KHz rate for scanning 262½ lines of delayed unprocessed video alternated with 262½ lines of estimated video in 1/60 second for a total of 525 lines.

Figure 1:
FIG. 1 represents a scanned image containing one field of information and showing the "black raster"
Figure 2:
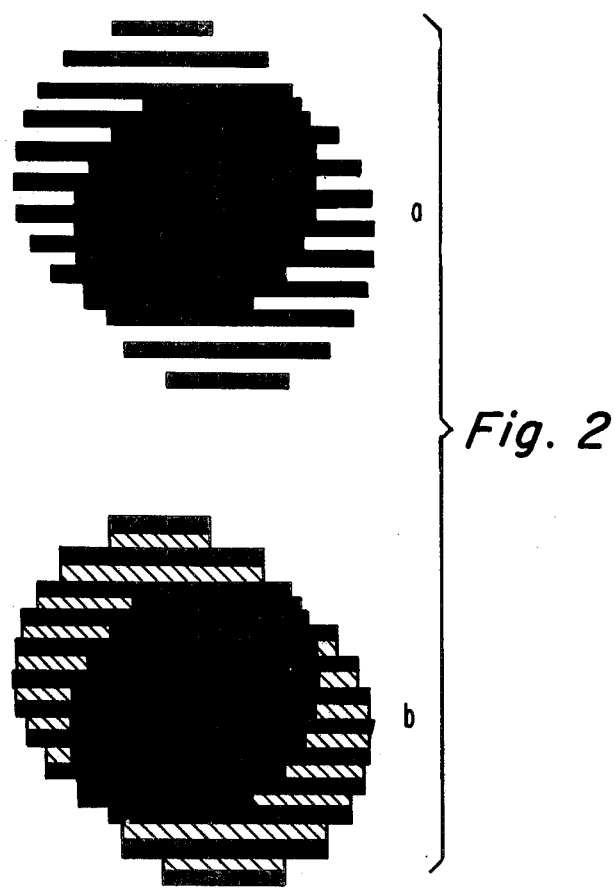
FIG. 2 represents a full frame image of a moving circular object displayed by interlaced line scanning showing a serrated-edge effect.

Thus, the arrangement of FIG. 3 for each 262½-line field of interlaced incoming video produces and displays 525 lines of progressively scanned or non-interlaced video. Such an image more closely approximates the appearance of a flat-field display (a display not having scanning lines), as illustrated by the image of a moving circular object displayed in interpolated manner shown in FIG. 2b.

Figure 4A:
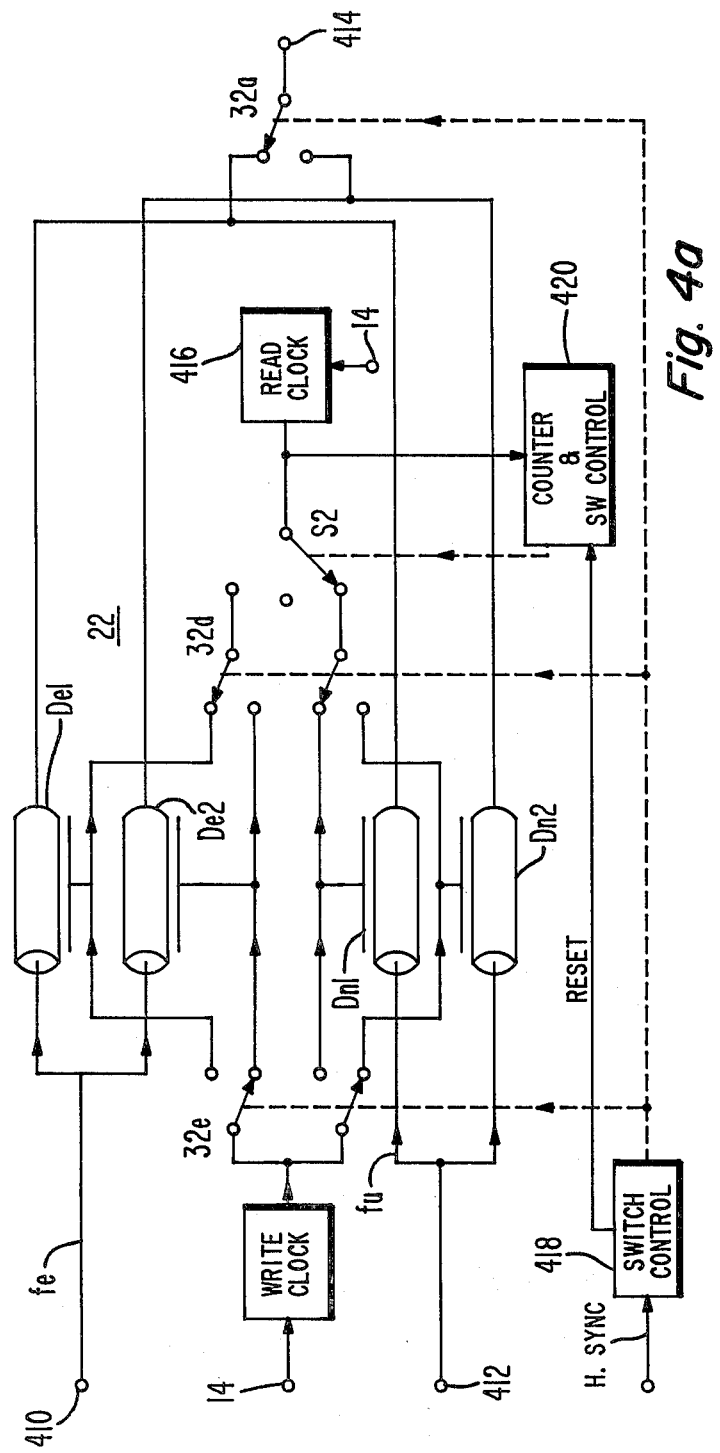
FIGS. 4, 5 and 6 show details of the embodiment of FIG. 3.
Figure 4B:
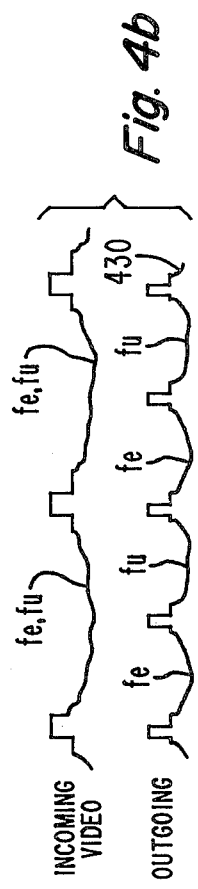

FIG. 4 illustrates FIFO buffer pair 20, 22 in more detailed block form. In FIG. 4, estimated signal $F_e$ is applied to an input terminal 410 and coupled to the inputs of estimated-signal delay lines DE1 and DE2. Unmodified delayed signal $F_U$ is applied to an input terminal 412 and is coupled to the inputs of clocked delay lines DN1 and DN2 which may be CCD delay lines. A write clock generator is coupled, with the switch positions shown, to delay lines DE2 and DN2, whereby DE2 and DN2 are clocked simultaneously at a low rate for loading with the estimated and unmodified signals, respectively. The loading occurs in approximately 53 $\mu$S. During the loading interval, output terminal 414 is coupled by way of switch 32a to the outputs of delay lines DE1 and DN1 for receiving signal from whichever delay line is clocked. In the positions shown, read clock 416 is coupled by switch S2 and switch 32c to clock DN1, which reads out at twice the write-in rate. Switches 32a, 32b and 32d are operated simultaneously by a switch control circuit 418 which receives horizontal sync indicative of the beginning of each incoming horizontal line. The horizontal sync signal may be derived for example from a sync separator (not shown) coupled to input terminal 10 to which the analog video is applied. Switches 32a, d and e are operated from the positions shown in FIG. 4 at the occurrence of the next horizontal sync interval. The switches are operated at each horizontal sync time so that they alternate positions. Switch S2 is operated at twice the rate of switch S28. Control of switch S2 is accomplished by resetting a counter and switch control circuit 420 at the time of occurrence of each incoming horizontal sync pulse. Counter 420 counts read clock pulses equal to the number of cells of storage of a delay line and toggles switch S2 so as to couple read clock generator 416 to the second delay line to be read out just as the first of the pair is emptied. Thus S2 normally toggles near the time of the center of a line of incoming video. Thus, video is continuously available at output terminal 414. FIG. 4b shows as $F_e$, $F_U$ the video signals applied to either terminal 410 or 412, which signals are substantially identical. The outgoing video 430 composed of alternate time-compressed $F_e$, $F_U$ segments is also shown in time relationship therewith.

Figure 5:
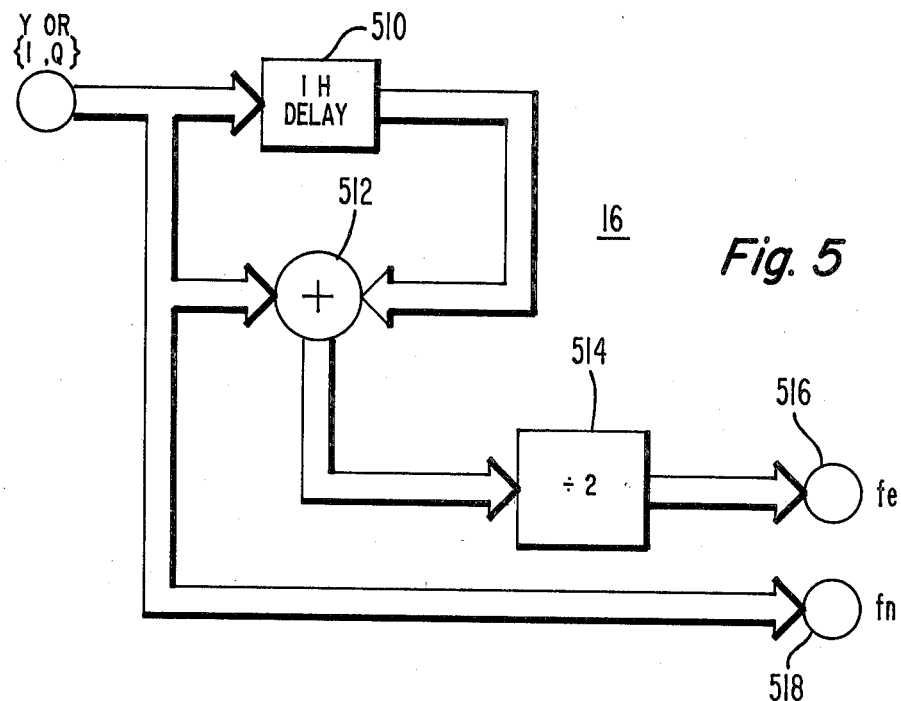

FIG. 5 illustrates the construction of an estimator such as estimator 16 of FIG. 3. In FIG. 5, input signal is applied to a one-line (1H) delay line 510 and to an input of an adder or summing circuit 512. Also applied to another input of adder 512 is video signal delayed by 1H. The output of the adder is a signal having an amplitude equal to the sum of the amplitudes of the input signals. In order to normalize the signal to produce a signal having an amplitude equal to the arithmetic average of the input and delayed input signals, the amplitude is divided by two in an attenuator 514. The averaged output signals is applied to an output terminal 516 and represents estimated output signal Fe. The undelayed input signal is also applied to an output terminal 518 and represents output signal $F_U$.

Figure 6:
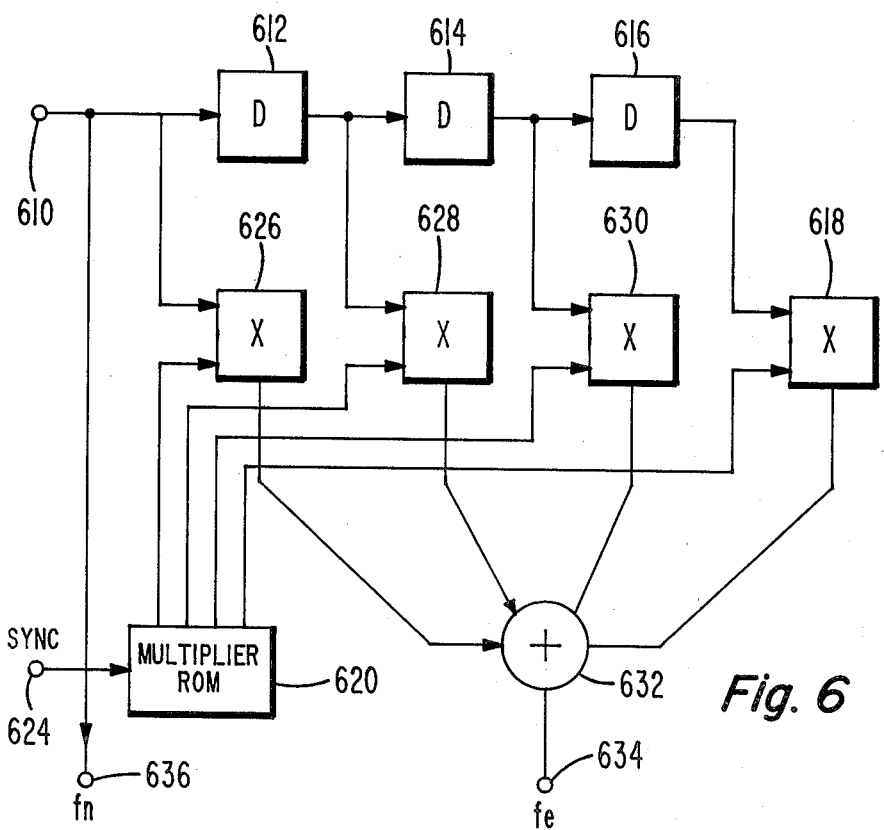

Other estimators may be used. FIG. 6 illustrates a square-law interpolator in which the input signal is applied to a cascade of 1H delay lines 612, 614 and 616. The input and output signals of each delay line are applied to individual multipliers which may be standard 8×8 multipliers for multiplying the signals by a known function (obtained from table look-up ROM 620). Multiplier ROM 620 generates a running variable in response to horizontal sync pulses applied to an input terminal 624 and applies the running variable as a second input to multipliers 618, 626, 628 and 630. The multiplied output of the multipliers is applied to a summing circuit 632 to generate at an output terminal 634, an estimated value Fe of an interstitial signal as described in more detail in U.S. patent application Ser. No. 262,619 filed May 11, 1981 in the name of K. H. Powers. The unmodified lines $F_U$ are obtained from the delayed input signal 610 at the output of the 1H delay line 612 and are applied to the output terminal 636.

Figure 9:
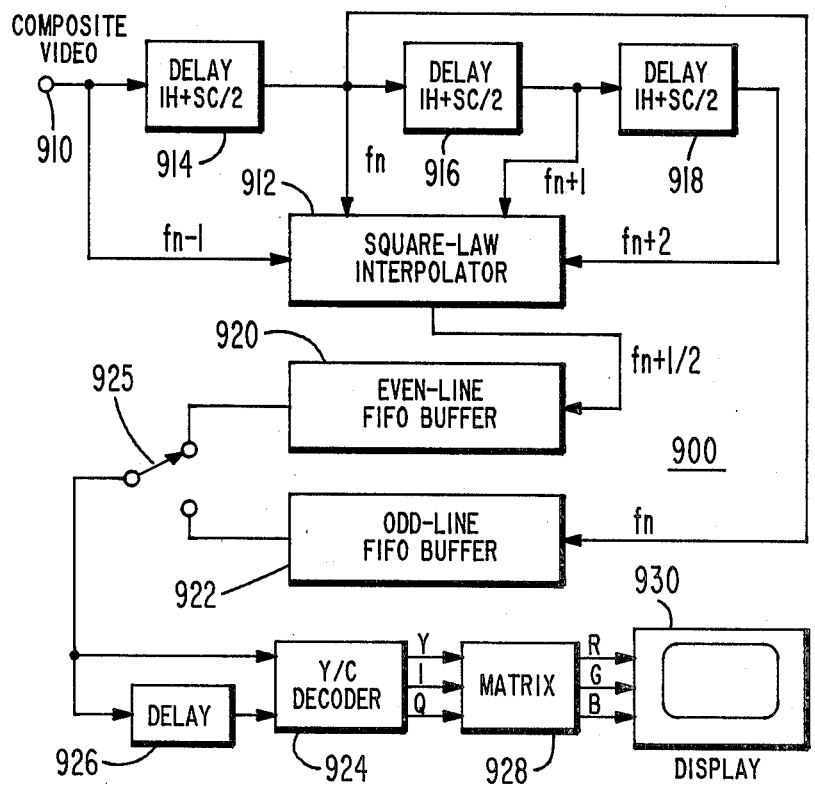
Figure 10:
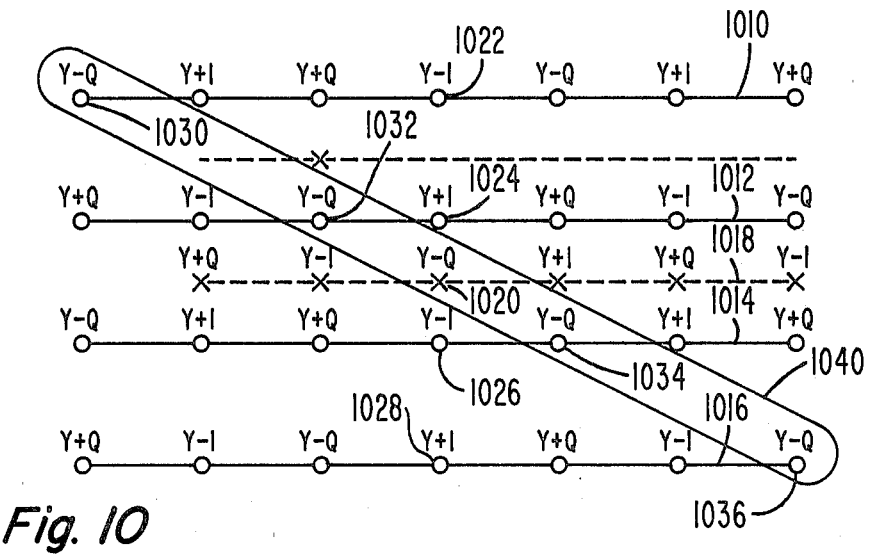
FIG. 10 is a diagram aiding in understanding of the embodiment of FIG. 9.

The arrangement of FIG. 3 when used with the square-law interpolator of FIG. 6 requires three such interpolators. The arrangement of FIG. 9 by comparison with the arrangement of FIG. 3 produces a flat field display from interlaced composite video by the use of a single square-law interpolator and only two FIFO buffers. In FIG. 9, composite video which may be either analog or digital is applied by way of an input terminal 910 to the input of a square-law interpolator 912 and to a cascade of delay lines 914–918. The output of delay line 914 is designated $F_n$, and the outputs of delay lines 916 and 918 are designated $F_{n+1}$ and $F_{n+2}$, respectively. The corresponding undelayed input signal is designated $F_{n-1}$, corresponding to the designations used in the aforementioned Powers patent application. The output of interpolator 912 designated as $F_{n+\frac{1}{2}}$ is applied to an even-line buffer 920, while the signal $F_n$ delayed by delay line 914 is applied to an odd-line buffer 922. The outputs of buffers 920 and 922 are applied to the terminals of a switch or gate illustrated as a toggle switch 924. Switch 924 couples the output signals from buffers 920 and 922 by way of two paths to outputs of a luminance chrominance decoder 924. One of the two paths includes a delay 926. The decoder produces Y, I and Q signals which are applied to a matrix 928 in which R, G and B signals are generated which are applied to a display 930. The delay of each of delay lines 914–918 is set to slightly exceed 1H. For the NTSC system, the excess delay equals the time of $\frac{1}{2}$-cycle of the color subcarrier (SC/2). This is explained in greater detail by reference to FIG. 10, which illustrates sample points on portions of four successive horizontal lines 1010–1016. For purposes of illustration, the sampling is assumed to be at the rate of 4×SC and phased on the I axis. The lower line 1016 represents the current input line $F_{n-1}$, while lines 1014, 1012, and 1010 corresponds to $F_n$, $F_{n+1}$, and $F_{n+2}$, respectively. The relative phase of the chrominance component is shown for each sample. Also shown is a dotted line 1018 representing a line of estimated video currently being interpolated from the surrounding four scanned lines of incoming video. Assuming that the pixel currently being estimated is 1020, it is clear that if delays 914–918 each have a value of 1H that the estimate would be formed from the values of pixels 1022–1028 vertically arrayed about point 1020. However, with such an array, the estimate would be made from four points, two of which have a value of Y−I and two having a value of Y+I. Consequently, the chrominance value would be suppressed, and the resulting estimated value would include only luminance. This monochrome estimate is prevented by the use of delay in excess of 1H by the amount of half a subcarrier cycle, which is approximately 140 nanoseconds for standard NTSC. With these delays, the interpolation for point 1020 is derived from four nearby samples 1030–1036 which lie along a diagonal and are outlined by a line 1040. All the samples 1030–1036 have the same subcarrier phase, so that the chrominance value does not cancel from the value of the estimated pixel.

The interpolation in interpolator 912 produces an estimated line of video 1018 between input lines 1012 and 1014, thereby producing a line of video designated $F_{n+\frac{1}{2}}$ concurrently with the current line of video. Since two lines of video are being generated simultaneously time compression must be used as described in conjunction with FIG. 3, and toggle 924 is used to arrange the estimated and unchanged lines into a time-multiplexed or time-alternating pattern for further processing. Delay line 926 has a delay of $\frac{1}{4}$ SC which because of the time compression has the same effect as a $\frac{1}{2}$ SC delay at the standard rate. Luminance-Chrominance decoder 924 creates sum and difference signals to create luminance and chrominance signals, respectively. The I and Q signals are separated by phase detection relative to burst, and the resulting Y, I and Q signals are applied to matrix 928 for converion to R, G and B which are applied to display 930 for display at a 31.5 KHz scan rate. Thus, the arrangement of FIG. 9 accepts interlaced composite video and produces at the field rate a flat-field display consisting of lines of unmodified video alternated with lines of square-law estimated video. Thus the number of lines being displayed is doubled, which reduces the visibility of the line-scan structure.

Figure 7:
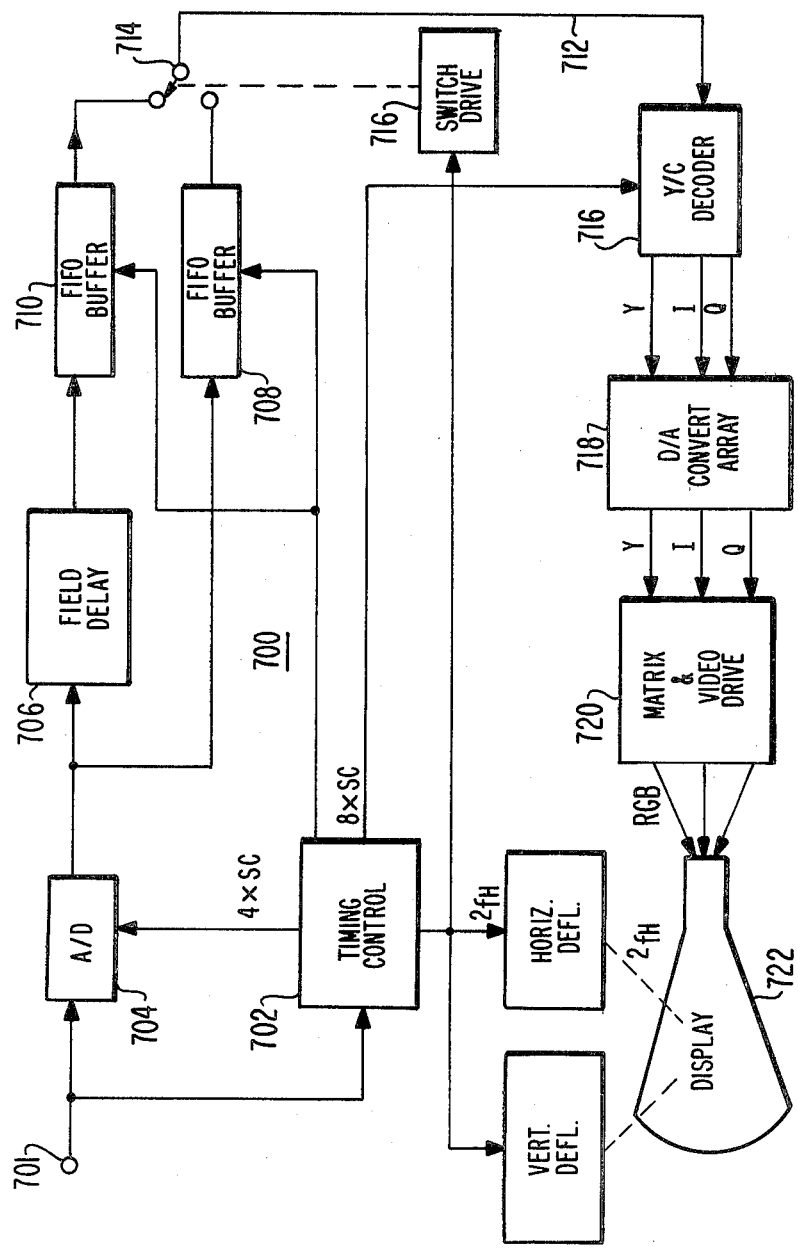
FIG. 7 is a diagram an embodiment of the invention using a field-delay memory for generating interstitial lines for display.

The arrangement of FIG. 7 uses a field store for generating a full raster of 525 lines of non-interlaced video for display, derived from fields of interlaced incoming video. In FIG. 7, interlaced fields of composite color signals having horizontal lines of video identified by horizontal sync signals recurring at a 15,734 Hz rate are applied by way of an input terminal 701 to a timing control circuit 702 and to an A/D converter 704. The signals are digitized in ADC 704 and are applied as current signal to the input of a field delay 706 and to a FIFO buffer 708. For each line of current video applied to the input of FIFO buffer 708, a corresponding line from the previous field is applied from the output of delay 706 to a FIFO buffer 710. Conceptually, the current and field-delayed signals applied to buffers 708 and 710 correspond to the current and estimated signals applied to the buffers in FIG. 3. Buffers 708 and 710 receive their input signals continuously and read out the signals sequentially at a line rate double that of either of their input signals (31.5 KHz) as described in conjunction with FIG. 4. The 31.5 KHz signals at the outputs of buffers 708 and 710 are alternately coupled to a conductor 712 by a toggle switch or gate 714 controlled by a switch drive control circuit 716 synchronized by timing control circuit 702. Thus, double-rate or 31.5 KHz time-compressed video signals appear on conductor 712 and are applied to a luminance-chrominance decoder 716 for separating the Y, I and Q components of the composite signal for conversion to analog by a DAC array 718. The analog Y, I and Q signals are applied to matrix and video drive circuits illustrated as a block 720, which drives a display tube 722 scanned at 31.5 KHz, twice the horizontal rate of the incoming signal. The vertical deflection rate is 1/60 second, the normal field rate of the incoming video signal. The arrangement of FIG. 7 requires only a field store to produce a progressively scanned non-interlaced display of 525 lines in 1/60 seconds for NTSC (625 lines in 1/50 second for PAL and similar signals). This reduces the line-scan pattern and gives a better approximation of a flat field display without objectionable increase in flicker. The arrangement of FIG. 7 has the advantage of requiring only a field store in order to produce the progressively scanned non-interlaced display, but has the disadvantage that each displayed raster consists of a current field and the preceding field. During a shift of scene, this can result in the display of a raster scan consisting of interleaved new and old-scene information. Also, the flicker rate cannot be increased by more than a factor of 2:1. The arrangement of FIG. 11 includes a memory capable of storing slightly more than one frame of incoming information, and allows a progressively scanned non-interlaced display in which the flicker rate is increased for better simulation of a flat field. In FIG. 11, analog interlaced video is applied by way of an input terminal 1110 to an ADC 1112 and to a synchronizing circuit 1114. Parallel-format digital information is applied to a memory with an architecture which is rendered easiest to understand by depiction as a wheel 1116. The wheel has a thickness of 8 bits, corresponding to the number of input lines, and the distance from the inner to the outer radius represents the number of samples per horizontal line, for the case of NTSC signals sampled at four times subcarrier, this corresponds to 910 bits. Thus, each pie-shaped section represents 910 samples each of 8 bits. Signal is applied to the memory by a write address generator depicted as a wiper 1118 which writes each line of incoming video into a pie-shaped segment such as 11002, so that the oldest information in each line appears at the outer edge of the wheel and the newest pixel information is stored in the 8-memory bits at the innermost radius. In the position shown, wiper 1118 started a field by writing line 1 of field 1 into pie-shaped segment 11001 and then in succession wrote lines 3,5,7 into segments 11003, 11005, 11007, respectively, and so forth about the wheel. The field which was started by writing into 11001 was completed by writing half a line into segment 11525, thereby completing 262½ lines or one field.

Memory segment 11525 as shown in FIG. 11 is being addressed by a READ wiper 1134 which rotates in the direction shown by the arrow about the memory wheel, following WRITE wiper 1118 by one horizontal line, corresponding to one segment. A corresponding READ wiper 1136 on the opposite side of the memory wheel rotates in the same direction as READ WIPER 1134, but one field later whereby wiper 1136 reads older information.

A toggle illustrated as a switch 1138 is operated at 2 FH so as to alternately connected READ wipers 1134 and 1136 to an output conductor 1140 which couples the signals to a luminance-chrominance decoder 1142 which decodes the signals into Y, I and Q components which are passed through a matrix 1144 to a display 1146 for progressively scanned display of lines taken alternately from positions on the memory wheel one field apart.

Figure 11A:
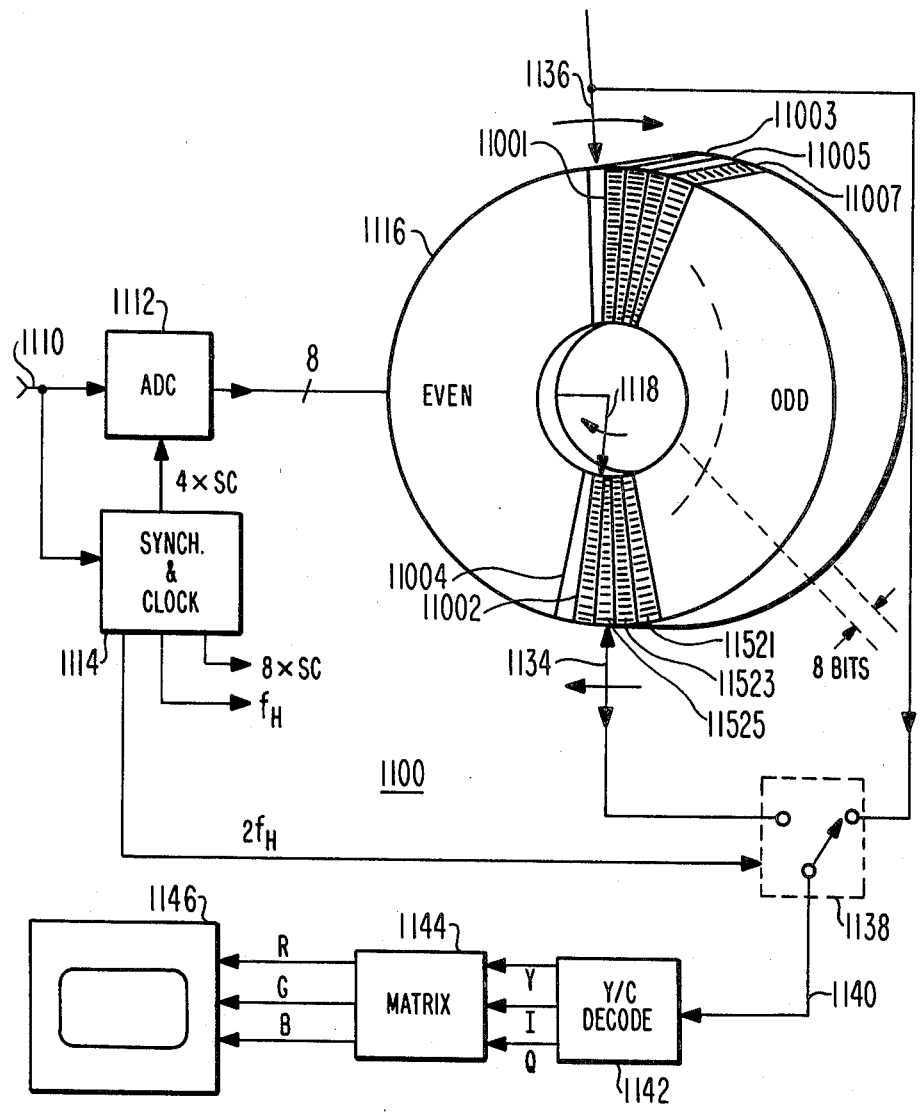
FIGS. 11a and 11b are embodiments of the invention in which a memory of 527 horizontal lines allows repeated reading of a full NTSC frame without loss of incoming information.

In FIG. 11a, WRITE wiper 1118 is shown as having just finished writing line 525 of the first or odd field into memory segment 11525, and is in the process of writing the first line of the next field (line 2 of the even field) into segment 11002. READ wiper 1134 follows WRITE wiper 1118 by one memory segment, and corresponding wiper 1136 rotates about the wheel in the same direction as READ wiper 1134. When READ wiper 1134 is on segment 11525, READ wiper 1136 is on an empty address adjacent address 11001.

During the next incoming horizontal line of information, WRITE wiper 1118 will write into segment 11004, while READ wipers 1136 and 1134 step to segments 11001 and 11002, respectively, and line 1 of the odd field is read out from segment 11001 and just-laid-down line 2 of the even field is read from segment 11002. The reading proceeds alternately at an 8×SC rate providing video time-compressed by a factor of 2. Consequently, the reading-out of the two lines of video in segments 11001 and 11002 occurs within the time required to write a single line into segment 11004.

As time progresses during the second field, wiper 1118 proceeds in a clockwise direction writing even lines into memory segments, and read-out proceeds with READ wiper 1136 reading out odd lines while wiper 1134 reads the corresponding just-laid-down even line.

Figure 12D:
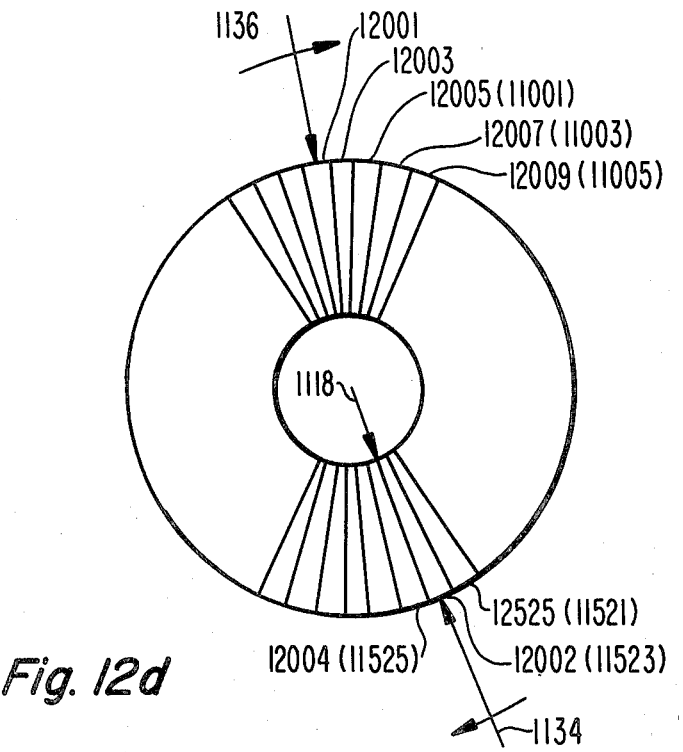
Figure 12A:
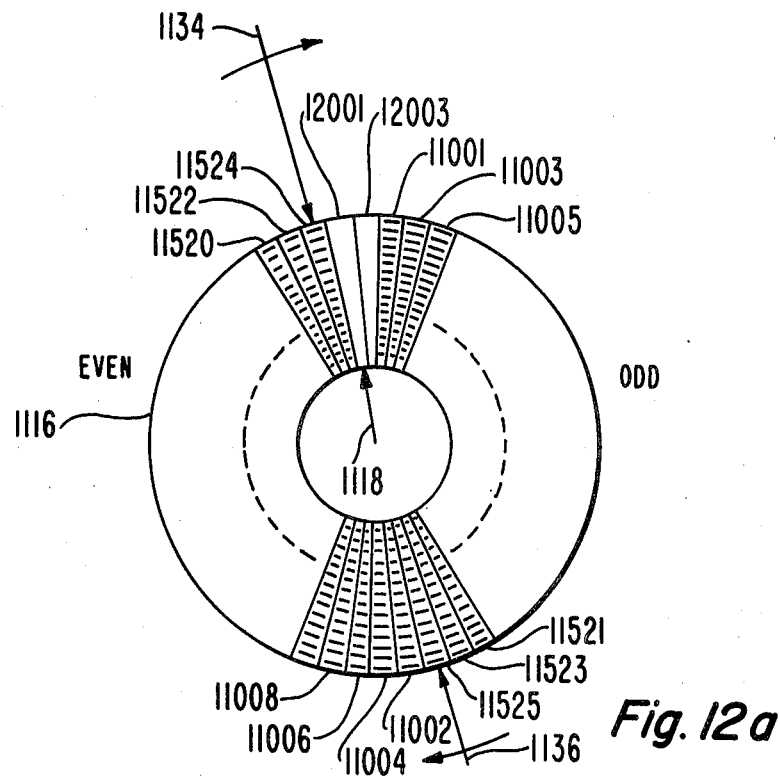
Figure 12B:
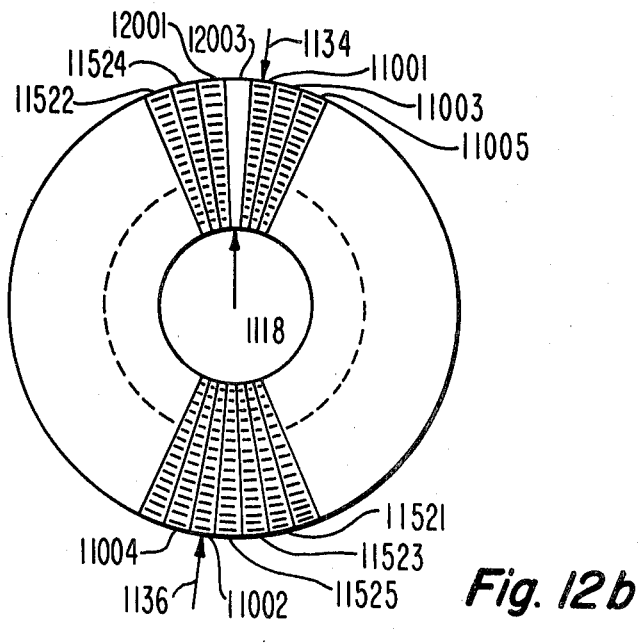

Eventually, WRITE wiper 1118 will reach a position such as is shown in FIG. 12a at which it has just finished writing even line 524 into memory segment 11524 and has stepped to the next following empty segment 12001. At the same time, READ wiper 1134 steps to segment 11524 just vacated by WRITE wiper 1118, and simultaneously READ wiper 1136 steps to segment 11525. During the next line interval of the incoming signal, segment 12001 is written into or filled with the first line of the first field of the next frame. At the time when segment 12001 is just full, reading of segment 11525 is completed. WRITE wiper 1118 steps to the last empty segment 12003, while at the same time READ wiper 1136 steps to the next segment 11002 and READ wiper 1134 steps forward two spaces to segment 11001. This position is shown in FIG. 12b. While segment 12003 is being filled with the second line of video of the odd field of the second frame, READ wiper 1134 reads line 1 of the preceding frame, followed in quick succession by reading of line 2 of the preceding frame by wiper 1136.

The reading of lines 1 and 2 from segments 11001 and 11002 constitutes the beginning of the second reading of the preceding frame. The reading of the frame occurs in the time required for writing in one field of current information. Since the current information cannot be overwritten into the memory until the second reading of the presently stored information has occurred, READ wiper 1134 precedes WRITE wiper 1118 in its clockwise excursion about the memory wheel, until near the end of the incoming first field of the second frame, the wiper positions are as illustrated in FIG. 12c.

In FIG. 12c, wipers 1134 and 1136 are positioned to read the last portions of the preceding frame by a second reading of lines 524 and 525 from memory segments 11524 and 11525. WRITE wiper 1118 is positioned at the memory location which was 11523 and writes into it line 2 of the second field of the second frame, thus converting memory segment 11523 to identification number 12002. When reading of 11524 and 11525 is completed, READ wiper 1136 steps clockwise to 12001 in readiness for the next read cycle and wiper 1134 steps counter clockwise by one step to segment 12002, and WRITE wiper 1118 steps clockwise by one memory segment to 11525. This positions READ wiper 1134 behind WRITE wiper 1118 for the next reading cycle as illustrated in FIG. 12d, during which READ wiper 1136 steps successively through odd segments 12001, 12003 . . . and READ wiper 1134 steps through even segments 12002, 12004 in a corresponding manner.

Near the end of the first reading of the second frame, the wiper positions are as shown in FIG. 12e. Wipers 1134 and 1136 are positioned to read lines 524 and 525 from segments 12524 and 12525, and WRITE wiper 1118 is positioned to write into segments 11522 (now containing "old" data, or essentially empty). Segment 11522 is overwritten with line 1 of field 1 of a third frame (becoming 13001) at the same time that the last two lines of Frame 2 are read from 12524 and 12525. The second reading of Frame 2 begins with wiper 1134 jumping ahead by two lines to segment 12001 while wiper 1136 steps ahead to 12002, in readiness for the second reading of lines 1 and 2 of Frame 2. At this time, WRITE wiper 1118 steps ahead to segment 11514 preparatory to overwriting into the segment the second odd line of field 3, connecting it to identification 13003. It will be recognized that this is the same condition as that prevailing at the beginning of the second reading of Frame 1. The operation continues with the cyclical advancing and retarding of READ wipers 1134 relative to the WRITE wiper position to produce multiple readings of each frame while at the same time providing continuous writing into the frame store, which contains only two lines of memory more than a complete frame. As a result of the two extra memory segments over a frame, the operation results in a counter clockwise progression or "precession" of the two "empty" segments about the periphery of the wheel.

Figure 11B:
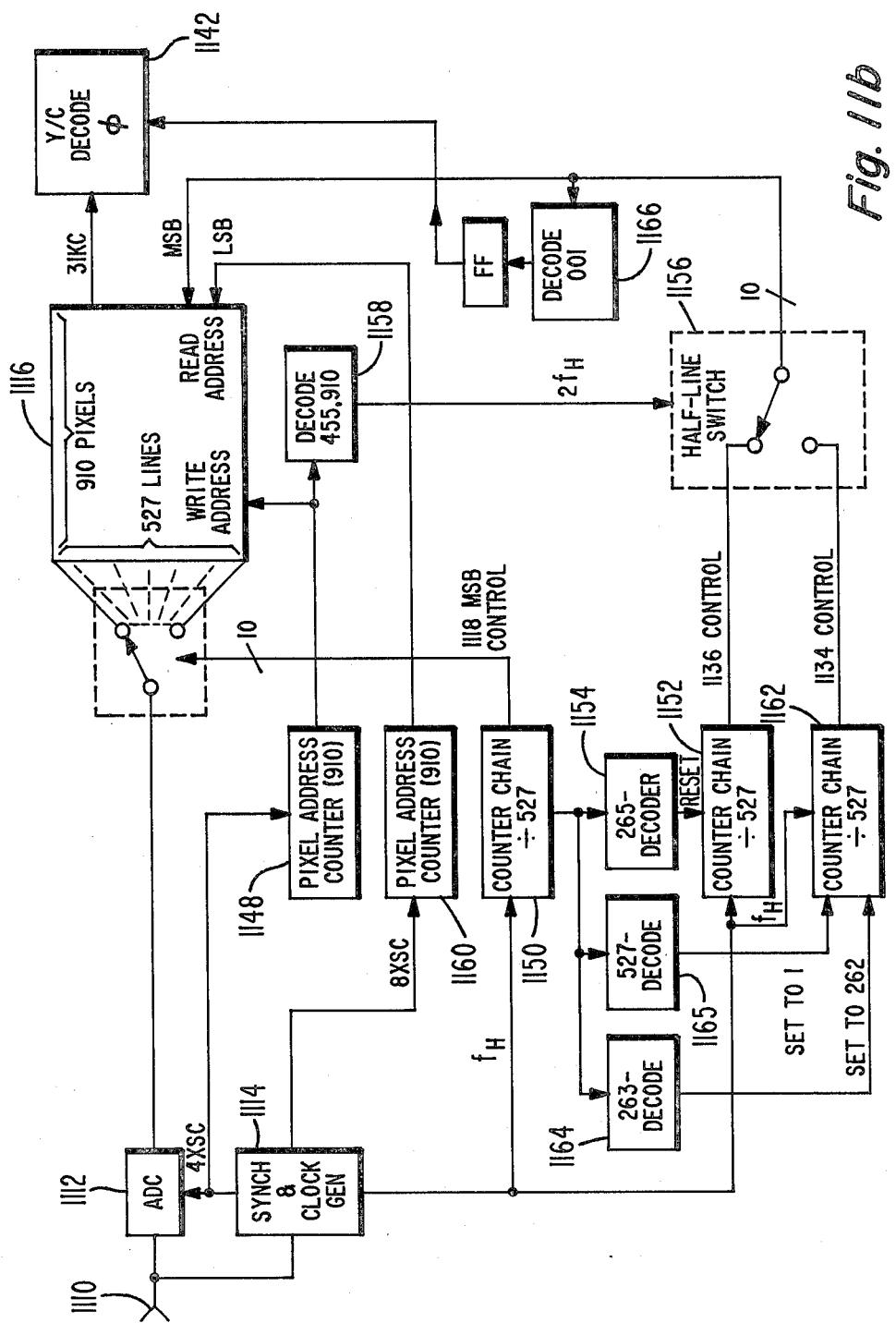

FIG. 11b is a more detailed block diagram of control portions of the memory arrangement of FIG. 11a. Those elements in FIG. 11b corresponding to elements in FIG. 11a are designated by the same reference numerals. Memory 1116 is illustrated as a standard rectangular memory having 527 lines each consisting of 910 pixels each having 8 bits. The address of each pixel includes a most-significant-bit (MSB) relating to the line number and a least-significant bit (LSB) relating to the pixel number. The WRITE pixel addresses are generated by a pixel address counter 1148 which receives 4×SC clock pulses and produces 910 unique addresses which are applied to memory 1116 as the LSB WRITE address. The MSB of the WRITE addresses are produced by a divide-by-527 counter chain illustrated as a block 1150 which counts horizontal-rate pulses and produces as a decoded output the MSB control of the address of WRITE wiper 1118. As described, WRITE wiper 1118 progresses through the memory periodically without stopping.

READ wiper 1136 makes a regular progression through the memory in synchronism with the WRITE wiper but offset therefrom by a constant 265 lines. Consequently, the MSB for the addresses for READ wiper 1136 can be generated by the decoded output of a divide-by-527 counter chain 1152 which is reset to zero by a decoder 1154 each time counter 1150 reaches the count of 265. The MSB produced by counter chain 1152 is coupled to the MSB portion of the READ address of memory 1116 by way of a half-line switch 1156 operated by a 2 fH signal derived by a decoder 1158 coupled to address counter 1148. Decoder 1158 decodes the output of counter 1148 and produces an output pulse each time the count reaches either 455 or 910. The LSB of the read address is generated by a pixel address counter 1160 driven by an 8×SC clock which results in reading of each line of information at double the writing rate.

The MSB for control of READ wiper 1134 is generated by a divide-by-527 counter chain 1162 which counts horizontal-rate signals and produces address control signals applied to the MSB input of the memory by way of switch 1156.

The stepping forward and stepping back of the positon of READ wiper 1134 relative to WRITE wiper 1118 is accomplished by a 263-decoder 1164 which responds to a count of 263 by counter chain 1150 and which sets counter 1162 to the count of 262, whereby wiper 1134 follows wiper 1118. A 527-decoder 1165 responds to a full count of 527 of counter 1150 and at that time sets counter 1162 to a count of 1. Since counter chain 527 resets itself to a count of zero upon the occurrence of the full count of 527, the resetting causes the addresses for wiper 1134 to precede the addresses for wiper 1118 by one line, as required.

Multiple readings of the same frame can result in an error in the chrominance phase which results from lack of completion of a full four-field chrominance frame. The chrominance decoder 1141 may include a phase shifter for shifting the chrominance phase at the beginning of reading of each new frame. For this purpose, a 001-decoder 1166 is coupled to the read MSB line and sets a flip-flop coupled to the phase-control input of decoder 1142.

Figure 14:
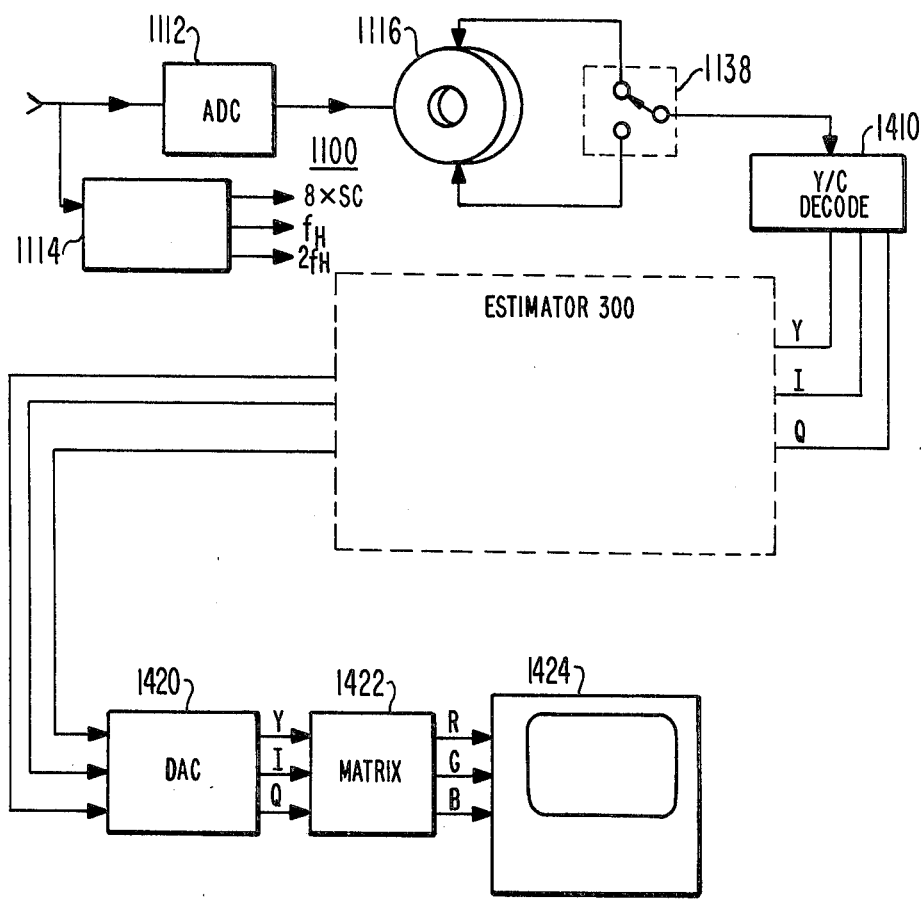
FIG. 14 is a block diagram of an embodiment of the invention in which repeated full-frame information further has the line-scan structure reduced by estimation.

The arrangement of FIG. 14 uses the full-frame-plus-two-lines system such as 1100 of FIG. 11 together with an estimator such as the estimator of FIG. 3 for producing repetitive full frames of 525 lines from memory 1116 interleaved with 525 estimated interstatial lines for producing a progressive display of 1050 lines with a high flicker rate. In FIG. 14, a double-rate (525 line in 1/60 second) progressive video is produced at the output of switch 1138 as described in conjunction with FIG. 11. This double-rate information is passed through a luminance-chrominance decoder 1410 for separation into Y, I and Q components which are applied to an estimator 300 of the type shown in FIG. 3, except that the delays are H/2 (corresponding to about 31.7 $\mu$S) for generating interstatial lines. Estimator 300 estimates the value which an interstitially scanned line would have, generating pairs of unmodified and estimated lines which are time-compressed by a further factor of two. These estimates are made for each of the Y, I and Q signals, which are then applied to a DAC array 1420 for producing analog Y, I and Q signals for application by way of a matrix 1422 to a display 1424 for producing a progressively scanned image of 1050 lines each 1/60 second.

Figure 8:
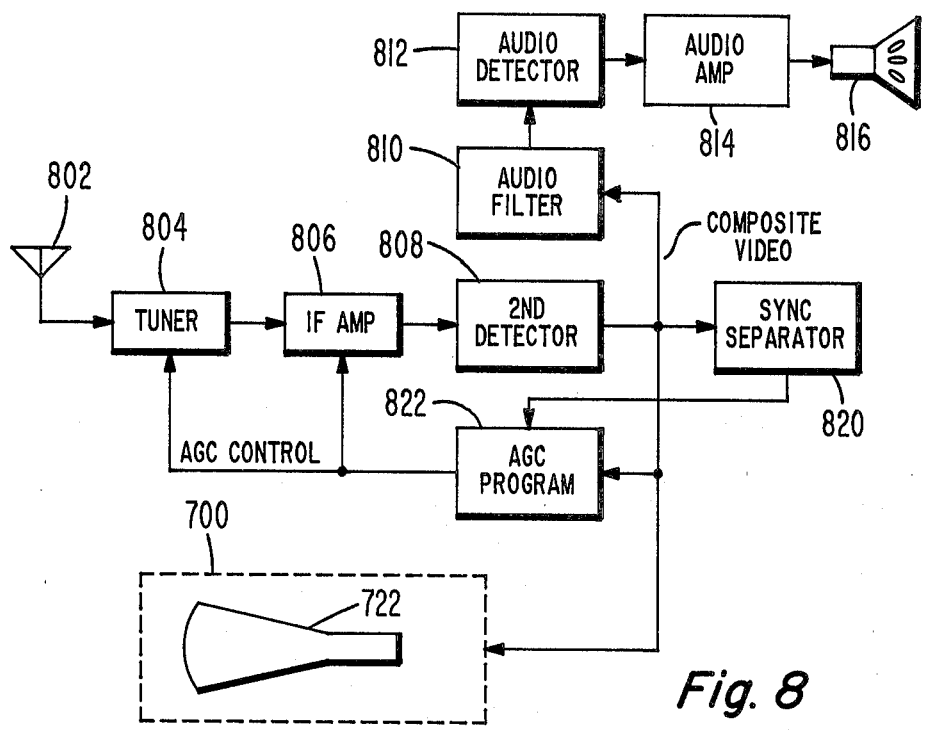
FIG. 8 is a block diagram of a television broadcast receiver incorporating a display according to the invention.

FIG. 8 illustrates a broadcast television receiver incorporating the display units according to the invention. In FIG. 8, an antenna 802 is coupled to a tuner 804 which selects one channel from among those received by the antenna and converts that channel to an intermediate frequency (IF) for amplification by an IF amplifier 806. The amplifier signal is applied to a second detector 808 for demodulation to baseband. At the output of the second detector is a composite television signal together with an audio signal FM-modulated onto a 4.5 MHz carrier. The FM carrier is selected by an audio filter 810 and applied to an audio FM detector 812 for producing baseband audio signal which is applied to an audio amplifier 814 and speaker 816. The composite video signal at the output of a second detector is applied to a sync separator 820 which separates horizontal sync for use in keying an AGC program or control circuit 822 and for other purposes in the receiver and display unit. The composite video applied to programmer 822 is keyed and the amplitude of the keyed signal is used to control the gain of controllable stages in tuner 804 and amplifier 806. The composite video is also applied to a display unit according to the invention which may be a display unit similar to display unit 700 of FIG. 7. As described, display unit 700 receives a field of interlaced signal each 1/60 second and produces in a like interval a progressively scanned or non-interlaced raster including information from the current field and from the previous field. Naturally, an estimator-type display as described in conjunction with FIG. 3 can be used instead of display 700 in FIG. 8.

Figure 13:
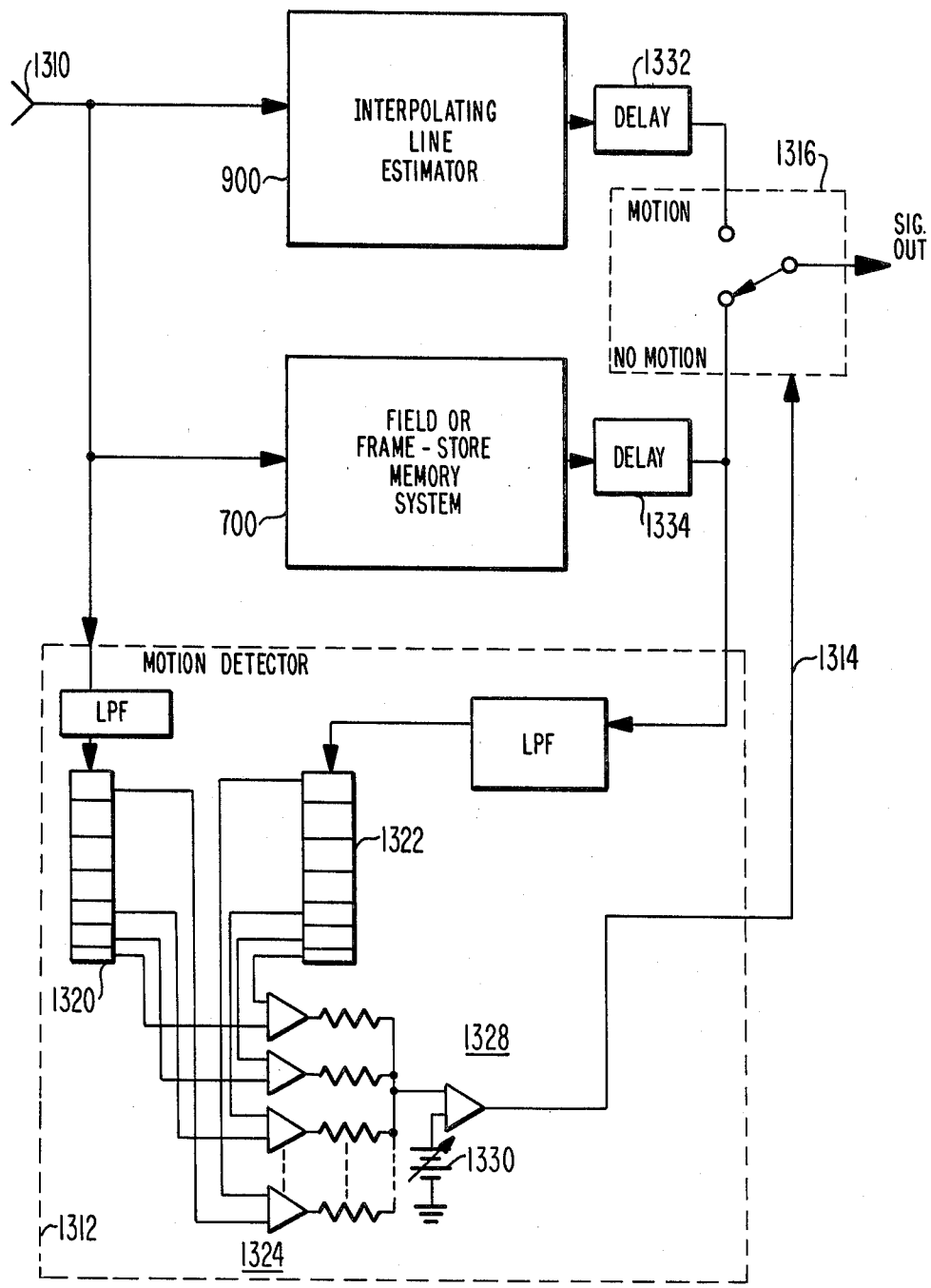
FIG. 13 displays either alternate stored and current data or alternate current and estimated data, depending on the presence or absence of motion in the scene.

As mentioned, the arrangement of FIG. 7 is subject to a problem in the presence of a change in scene or substantial motion in a scene, in which case multiple interlaced images appear on the scanned raster. However, in the absence of motion as for example in areas in which there is an unchanged background, the display produced by progressive scanning of current lines of video interlaced with lines from a field store gives an accurate representation of the image. The interpolators of FIGS. 3 and 9 merely produce an estimate of the interstitial video, which may sometimes be erroneous. However, the effects of motion do not greatly influence the estimated video. FIG. 13 illustrates an arrangement including an estimator and a field or frame-store memory together with an arrangement for switching between estimates, depending upon whether motion exists in a particular portion of the raster being estimated. In FIG. 13, digital video is applied by way of an input terminal 1310 to inputs of an interpolating line estimator 900 and a field-store memory arrangement 700. Estimator 900 is similar to the square-law interpolator designated generally as 900 and illustrated in FIG. 9. Field-store memory system 700 is similar to the system of FIG. 7. The input signal applied to input terminal 1310 is also applied to a motion detector 1312 for comparison with delayed data for establishing the presence or absence of motion by generation of a switch control signal on an output conductor 1314. The signal on on conductor 1314 is applied to a multiplex switch 1316 which in the presence of motion couples to an output circuit the signal from estimator 900 and in the absence of motion couples to the output circuit the output of the field or frame store memory. The output circuit may include a luminance-chrominance decoder, matrix and display as illustrated in FIGS. 7 or 9.

Motion detector 1312 may include a first and second delay line 1320 and 1322 coupled respectively to receive low-pass filtered current and field-delayed signals and to further delay them by a transmission-line delay such as a CCD delay line. At each step of the delay as the signal passes through delays 1320 and 1322, comparators illustrated generally as 1324 compare each current pixel with the field-delayed corresponding pixel and each produces a signal indicative of the degree of match. The signals are summed through weighting resistors designated generally as 1326 and applied to a comparator 1328 which compares the weighted signal with a predetermined threshold illustrated as a battery 1330 for deciding whether there is or is not motion locally in the scene. In order to match the time of occurrence of the signals being processed with the time of occurrence of the control signal, further delays 1332 and 1334 may be required. Other known forms of motion detector may also be used.

Other embodiments of the invention will be apparent to those skilled in the art. In particular, display functions not shown may be incorporated at suitable points; such functions include gamma correction, vertical and horizontal aperture correction, color, tint, brightness and contrast control, clamping, delay matching, coring and paring the like, which are all known functions and which may be implemented in known fashion. While the embodiments shown perform their functions in a digital mode, analog signal processing can be used.

What is claimed is:

1. A method for producing a flat-field representation of a line-scanned image
    said method comprising the steps of:
    producing scanned lines of video signals each of which is representative of a line scan of the image information, which scanned lines of video signals, if displayed, produce an objectionable line-scan structure;
    storing at least one line of said scanned lines of video signals to provide stored video;
    comparing said stored video with at least one temporally adjacent scanned line of video to produce an estimated value of the video which would be produced by a line-scan of said image between said stored and adjacent lines, thereby producing an estimated line of video;
    time-compressing said stored, estimated and adjacent lines by a factor related to the quotient of a sum and the number of scanned lines of video per frame, where said sum is the sum of the number of said estimated lines and said scanned lines of video per frame; and
    displaying fields of video by progressive scanning of said scanned lines of video alternated with said estimated lines of video whereby said objectionable line-scan structure is made less visible.

2. A method for producing a flat-field representation of a line-scanned image, said method comprising the steps of:
    producing scanned lines of composite color television signals each of which is representative of a line scan of the image information, which scanned lines of composite color television signals, if displayed, produce an objectionable line-scan structure;
    storing at least one line of said scanned lines of composite color television signals to produce stored video;
    comparing said stored video with at least one temporally adjacent scanned line of television signals to produce an estimated value of the video which would be produced by a line-scan of said image between said stored and adjacent lines, thereby producing an estimated line of video, said comparing step further comprising the step of separating the luminance component from the chrominance component of said composite video;
    time-compressing said stored, estimated and adjacent lines by a factor related to the quotient of a sum and the number of scanned lines of composite color television lines per frame, where said sum is the sum of the number of said estimated lines and said scanned lines per frame; and
    displaying fields of video by progressive scanning of said scanned lines of color television signals alternated with said estimated lines of video whereby said objectionable line-scan structure is made less visible.

3. A method according to claim 2 further comprising the steps of
    delaying a said component of said composite signal to form first, second and third delayed component samples relatively delayed with respect to a current component sample; and
    summing together weighted values of said composite segment and at least some of said delayed samples to form an interpolated signal representative of said estimated lines of video.

4. A method according to claim 2 wherein said number of scanned line of video per frame is 525, said number estimated lines is 525 and said factor is two.

5. A television display for producing a flat-field representation of a line-scanned image from video signals representative of scanned-line image information comprising:
    delay means for storing at least one line of the scanned-line video signals to produce stored video signal;
    estimating means coupled to said delay means and with the source of said scanned-line video signals for comparing said stored video signal with at least one temporally-adjacent line of said scanned-line video signals to produce an estimated value of the video which would be produced by a line-scan of said image at a path physically between the paths scanned to produce said stored and adjacent video signals, thereby producing lines of estimated video signals;

time-compressing means coupled to said estimating means and to said delay means for time-compressing said stored, adjacent and estimated video signals by a factor related to the quotient of a sum and the number of scanned lines of scanned-line image information per frame, where said sum is the sum of the number of said estimated lines and said scanned lines of scanned-line video signals per frame, and display means coupled to said time-compression means for displaying fields of video by progressive scanning of said lines of estimated video alternated with lines of said scanned-line video signals.

6. A method for producing an image of a scene which is line-scanned in an interlaced manner for successively generating first and second fields of interlaced line-scan video signals each frame of which is representative of the scene, the method comprising the steps of:

storing in a memory at least a full frame of said video signals;

displaying a frame of line-scan video signals from said memory in a progressive noninterlaced manner for decreasing the visibility of the line-scan structure of the image, whereby the flicker rate objectionably decreases; and repeating said displaying step from old image information whereby the objectionable low flicker rate increases.

7. A method according to claim 6 further comprising the steps of time-compressing said video signals by a factor depending upon the number of said repetitions.

8. A method according to claim 7 wherein said factor is the sum of one plus the number of said repetitions.

9. A method according to claim 6 further comprising the steps of storing at least one of said line-scan video signals from said memory to produce a stored line of video; comparing said stored line of video with at least one spatially adjacent scanned line of video to produce an estimate of the value of the video which would be produced by a line scan of the scene between the lines of the frame, thereby producing estimated lines of video; and displaying said estimated lines of video alternately with said line-scan video signals from said memory for further decreasing the visibility of said line-scan structure of the image.

10. A television display apparatus for producing an image of a scene which is represented by first and second fields of interlaced lines of video signals comprising:

memory means coupled to the source of video signals for controllably storing at least one frame of said video signals;

writing control means coupled to said memory means and to said source of video signals for controlling the writing of said video signals into said memory means for storing at least one full frame of said video signals in said memory means; and reading control means coupled to said memory means for reading in a time-compressed manner from said memory means alternate odd and even lines of said video signals; and display means coupled to said memory means and to said reading control means for progressively displaying said odd and even lines of video signals.

11. A method for producing an image of a scene which is line-scanned in an interlaced manner for successively generating first and second fields of interlaced line-scan video signals each frame of which is representative of the scene, the method comprising the steps of:

storing in a memory a field of said video signals to form stored video signals;

time-compressing said first video signals to form time-compressed first video signals;

time-compressing said stored video signals to form time-compressed stored video signals;

time-division multiplexing said time-compressed first and stored video signals together to produce multiplexed video signals; and displaying said multiplexed video signals in a progressive noninterlaced manner for decreasing the visibility of the line-scan structure of the image.

12. A method according to claim 11 wherein said multiplexing step is performed on a line-to-line basis for creating alternate lines of said first and stored video signals.

13. A method for producing an image of a scene which is line-scanned in an interlaced manner for successively generating first and second fields of interlaced line-scanned video signals each frame of which is representative of the scene;

the method comprising the steps of:

storing in a memory at least a field of said video signals to form delayed line-scan video signals;

displaying a frame of line-scan video signals in a progressive noninterlaced manner alternating between lines of said video signals and lines of said delayed video signals whereby successive frames displayed are comprised of even and odd adjacent fields.

* * * * *